United States Patent
Kim et al.

(10) Patent No.: US 10,007,865 B1
(45) Date of Patent: Jun. 26, 2018

(54) LEARNING METHOD AND LEARNING DEVICE FOR ADJUSTING PARAMETERS OF CNN BY USING MULTI-SCALE FEATURE MAPS AND TESTING METHOD AND TESTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days. days.

(21) Appl. No.: 15/784,272

(22) Filed: Oct. 16, 2017

(51) Int. Cl.
*G06K 9/00* (2006.01)
*G06K 9/62* (2006.01)
*G06N 3/08* (2006.01)

(52) U.S. Cl.
CPC .......... *G06K 9/6231* (2013.01); *G06K 9/623* (2013.01); *G06K 9/6251* (2013.01); *G06K 9/6265* (2013.01); *G06N 3/084* (2013.01)

(58) Field of Classification Search
CPC combination set(s) only.
See application file for complete search history.

(56) References Cited

U.S. PATENT DOCUMENTS

| | | | | |
|---|---|---|---|---|
| 2017/0011281 | A1* | 1/2017 | Dijkman | G06K 9/66 |
| 2017/0124415 | A1* | 5/2017 | Choi | G06N 3/08 |
| 2017/0206431 | A1* | 7/2017 | Sun | G06N 3/084 |

* cited by examiner

*Primary Examiner* — Alex Liew
(74) *Attorney, Agent, or Firm* — Husch Blackwell LLP (57) ABSTRACT

A learning method for acquiring a bounding box corresponding to an object in a training image from multi-scaled feature maps by using a CNN is provided. The learning method includes steps of: (a) allowing an N-way RPN to acquire at least two specific feature maps and allowing the N-way RPN to apply certain operations to the at least two specific feature maps; (b) allowing an N-way pooling layer to generate multiple pooled feature maps by applying pooling operations to respective areas on the at least two specific feature maps; and (c) (i) allowing a FC layer to acquire information on pixel data of the bounding box, and (ii) allowing a loss layer to acquire first comparative data, thereby adjusting at least one of parameters of the CNN by using the first comparative data during a backpropagation process.

30 Claims, 6 Drawing Sheets

LEARNING METHOD AND LEARNING DEVICE FOR ADJUSTING PARAMETERS OF CNN BY USING MULTI-SCALE FEATURE MAPS AND TESTING METHOD AND TESTING DEVICE USING THE SAME

FIELD OF THE INVENTION

The present invention relates to a learning method, and a learning device for adjusting parameters of a CNN by using multi-scale feature maps and a testing method and a testing device using the same, and more particularly, to the learning method including steps of: (a) allowing a Region Proposal Network (RPN), if the multi-scaled feature maps are generated as a result of applying convolution operations to the training image, to acquire at least two specific feature maps among the multi-scaled feature maps as inputs and then allowing the RPN to apply certain operations to the at least two specific feature maps to thereby generate predetermined number of proposal boxes; (b) allowing a pooling layer to generate multiple pooled feature maps by applying pooling operations to respective areas, corresponding to that of the predetermined number of the proposal boxes, on the at least two specific feature maps; and (c) performing processes of (i) allowing a FC layer to acquire information on pixel data of the bounding box by applying regression operations to the multiple pooled feature maps, and (ii) allowing a loss layer to acquire first comparative data by comparing between the information on the pixel data of the bounding box in the training image and that of a bounding box in a GT image, thereby adjusting at least one of parameters of the CNN by using the first comparative data during a backpropagation process; and the learning device, the testing method and the testing device using the same.

BACKGROUND OF THE INVENTION

In Machine Learning, a convolutional neural network (CNN or ConvNet) is a class of deep, feed-forward artificial neural network that has successfully been applied to analyzing visual imagery.

Figure 1:
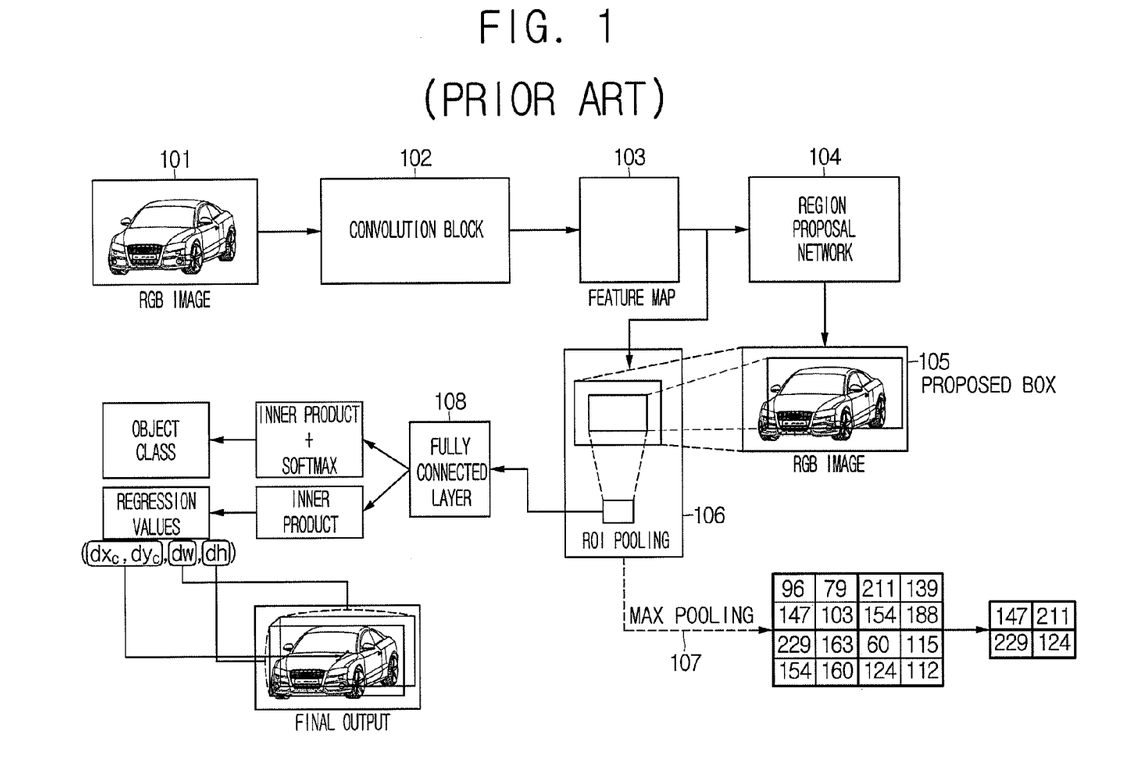
FIG. 1 is a drawing schematically illustrating a learning process of a conventional CNN according to prior art.

FIG. 1 is a drawing schematically illustrating a learning process of a conventional CNN according to prior art. Specifically, the figure shows the process of comparing a bounding box predicted or estimated by a learning device with a Ground Truth (GT) bounding box.

Referring to FIG. 1, the process of the learning device conventionally acquiring losses by comparing the predicted bounding box with the GT bounding box will be delineated. Herein, the losses stand for differences between the predicted bounding box and the GT bounding box, and are denoted as $dx_c$, $dy_c$, dw, dh in FIG. 1.

First, as illustrated in FIG. 1, the learning device may acquire an RGB image as an input to be fed into a plurality of convolutional layers, i.e., convolutional filters, included in a convolution block. A size, e.g., width and height, of the RGB image becomes smaller and smaller in the width and the height while the number of channels is incremented as the RGB image passes through the plurality of convolutional layers.

As illustrated in FIG. 1, the learning device allows a Region Proposal Network (RPN) to generate proposal boxes from an ultimate feature map outputted by the convolution block and allows a pooling layer, e.g., ROI pooling layer, to resize areas on the feature map corresponding to the proposal boxes to a predetermined size, e.g., a size of 2×2, by applying a max pooling operation (or an average pooling operation) to pixel data of the areas on the feature map corresponding to the proposal boxes. As a result, a pooled feature map is acquired. Herein, the max pooling operation is an operation by which the maximum value in each of sub-regions divided from an area to be used for pooling operations is selected as respective representative values for the respective sub-regions, as shown in the bottom right of FIG. 1.

Next, the pooled feature map may be allowed to be fed into a fully connected (FC) layer as an input of the FC layer. Also, the learning device may allow the FC layer to recognize a type or a category of an object in the RGB image. For a reference, the pooled feature map may also be referred to as a feature vector.

In addition, the predicted bounding box in the RGB image may be acquired through the FC layer, and the losses may also be acquired by comparing between the predicted bounding box and the ground truth (GT) bounding box. Herein, the GT bounding box represents a bounding box precisely surrounding the object in the RGB image, which may usually be prepared by a human being.

Lastly, the learning device in FIG. 1 may adjust at least one of parameters included in the FC layer, the RPN, or the plurality of convolutional layers to reduce the losses during a backpropagation process. After adjusting the parameters, a testing device may acquire a bounding box surrounding an object in a test image, later.

However, the testing device including the CNN with the adjusted parameters may not acquire the bounding box precisely surrounding the object in the test image yet. Since a smallest sized feature map generated as a result of applying convolution operations multiple times to the test image is generally used, it is insufficient to express the object with the smallest sized feature map.

Accordingly, the applicant of the present invention proposes a learning method, a learning device for acquiring a bounding box with high precision from a plurality of multi-scaled feature maps, and a testing method and a testing device using the same are disclosed herein as well.

SUMMARY OF THE INVENTION

It is an object of the present invention to solve the problems described above.

It is another object of the present invention to allow a pooling layer to generate multiple pooled feature maps by applying pooling operations to respective areas, corresponding to those of predetermined number of proposal boxes generated by an N-way RPN, on at least two specific feature maps among multiple feature maps with different scales.

It is still another object of the present invention to allow a FC layer to acquire a bounding box more precisely by applying regression operations to a concatenated feature vector generated on the basis of the multiple pooled feature maps, and to allow a loss layer to acquire losses by comparing between the acquired bounding box and that in a GT image in order to adjust parameters during a backpropagation process.

It is still yet another object of the present invention to obtain a bounding box with high accuracy surrounding an object in a test image later by using the adjusted parameters.

In accordance with one aspect of the present invention, there is provided a learning method for acquiring a bounding box corresponding to an object in a training image from multi-scaled feature maps by using a CNN, including steps of: (a) a learning device, if the multi-scaled feature maps are generated as a result of applying convolution operations to the training image, allowing an N-way Region Proposal Network (RPN) to acquire at least two specific feature maps among the multi-scaled feature maps as inputs and then allowing the N-way RPN to apply certain operations to the at least two specific feature maps to thereby generate predetermined number of proposal boxes; (b) the learning device allowing an N-way pooling layer to generate multiple pooled feature maps by applying pooling operations to respective areas, corresponding to that of the predetermined number of the proposal boxes, on the at least two specific feature maps; and (c) the learning device performing processes of (i) allowing a FC layer to acquire information on pixel data of the bounding box by applying regression operations to the multiple pooled feature maps, and (ii) allowing a loss layer to acquire first comparative data by comparing between the information on the pixel data of the bounding box in the training image and that of a GT bounding box in a GT image, thereby adjusting at least one of parameters of the CNN by using the first comparative data during a backpropagation process.

In accordance with another aspect of the present invention, there is provided a testing method for acquiring a bounding box for testing corresponding to an object for testing in a test image from multi-scaled feature maps for testing by using a CNN in a testing device, including steps of: (a) the testing device, if the multi-scaled feature maps for testing are generated as a result of applying convolution operations to the testing image, allowing an N-way Region Proposal Network (RPN) to acquire at least two specific feature maps for testing among the multi-scaled feature maps for testing as inputs and then allowing the N-way RPN to apply certain operations to the at least two specific feature maps for testing to thereby generate predetermined number of proposal boxes for testing, on conditions that processes of (1) a learning device, if multi-scaled feature maps for training are generated as a result of applying convolution operations to a training image through multiple convolutional layers, allowing the N-way RPN to acquire at least two specific feature maps for training among the multi-scaled feature maps for training as inputs, and then allowing the N-way RPN to apply certain operations to the at least two specific feature maps for training to thereby generate predetermined number of proposal boxes for training, (2) the learning device allowing an N-way pooling layer to generate multiple pooled feature maps for training by applying pooling operations to respective areas, corresponding to that of the predetermined number of the proposal boxes, on the at least two specific feature maps for training, and (3) the learning device allowing a FC layer to acquire information on pixel data of a bounding box for training by applying regression operations to the multiple pooled feature maps for training, and the learning device allowing a loss layer to acquire comparative data by comparing between the information on the pixel data of the bounding box for training and that of a bounding box in a GT image, thereby adjusting at least one of parameters of the CNN by using the comparative data during a backpropagation process have been performed; (b) the testing device allowing the N-way pooling layer to generate multiple pooled feature maps for testing by applying the pooling operations to respective areas, corresponding to the predetermined number of the proposal boxes for testing, on the at least two specific feature maps for testing; and (c) the testing device allowing the FC layer to acquire information on pixel data of the bounding box for testing by applying the regression operations to the multiple pooled feature maps for testing.

In accordance with still another aspect of the present invention, there is provided a learning device for acquiring a bounding box corresponding to an object in a training image from multi-scaled feature maps by using a CNN, including: a communication part for acquiring the training image; and a processor for performing processes of (1) if the multi-scaled feature maps are generated as a result of applying convolution operations to the training image, allowing an N-way Region Proposal Network (RPN) to acquire at least two specific feature maps among the multi-scaled feature maps as inputs and then allowing the N-way RPN to apply certain operations to the at least two specific feature maps to thereby generate predetermined number of proposal boxes; (2) allowing an N-way pooling layer to generate multiple pooled feature maps by applying pooling operations to respective areas, corresponding to that of the predetermined number of the proposal boxes, on the at least two specific feature maps; and (3) (i) allowing a FC layer to acquire information on pixel data of the bounding box by applying regression operations to the multiple pooled feature maps, and (ii) allowing a loss layer to acquire first comparative data by comparing between the information on the pixel data of the bounding box in the training image and that of a GT bounding box in a GT image, thereby adjusting at least one of parameters of the CNN by using the first comparative data during a backpropagation process.

In accordance with still yet another aspect of the present invention, there is provided a test device for acquiring a bounding box for testing corresponding to an object for testing in a test image from multi-scaled feature maps for testing by using a CNN in a testing device, including: a communication part for acquiring the test image, on conditions that learning processes of (i) a learning device, if multi-scaled feature maps for training are generated as a result of applying convolution operations to a training image through multiple convolutional layers, allowing an N-way RPN to acquire at least two specific feature maps for training among the multi-scaled feature maps for training as inputs, and then allowing the N-way RPN to apply certain operations to the at least two specific feature maps for training to thereby generate predetermined number of proposal boxes for training, (ii) the learning device allowing an N-way pooling layer to generate multiple pooled feature maps for training by applying pooling operations to respective areas, corresponding to that of the predetermined number of the proposal boxes, on the at least two specific feature maps for training, and (iii) the learning device allowing a FC layer to acquire information on pixel data of a bounding box for training by applying regression operations to the multiple pooled feature maps for training, and the learning device allowing a loss layer to acquire comparative data by comparing between the information on the pixel data of the bounding box for training and that of a bounding box in a GT image, thereby adjusting at least one of parameters of the CNN by using the comparative data during a backpropagation process have been performed; and a processor for performing processes of (1) if the multi-scaled feature maps for testing are generated as a result of applying convolution operations to the testing image, allowing the N-way Region Proposal Network (RPN) to acquire at least two specific feature maps for testing among the multi-scaled feature maps for testing as inputs and then allowing the N-way RPN to apply certain operations to the at least two specific feature maps for testing to thereby generate predetermined number of proposal boxes for testing, (2) allowing the N-way pooling layer to generate multiple pooled feature maps for testing by applying the pooling operations to respective areas, corresponding to the predetermined number of the proposal boxes for testing, on the at least two specific feature maps for testing; and (3) allowing the FC layer to acquire information on pixel data of the bounding box for testing by applying the regression operations to the multiple pooled feature maps for testing.

BRIEF DESCRIPTION OF THE DRAWINGS

The drawings attached below are to explain example embodiments of the present invention and are only part of preferred embodiments of the present invention. Other drawings may be obtained based on the drawings herein without inventive work for those skilled in the art. The above and other objects and features of the present invention will become conspicuous from the following description of preferred embodiments given in conjunction with the accompanying drawings, in which.

DETAILED DESCRIPTION OF THE PREFERRED EMBODIMENTS

To make purposes, technical solutions, and advantages of the present invention clear, reference is made to the accompanying drawings that show, by way of illustration, more detailed example embodiments in which the invention may be practiced. These preferred embodiments are described in sufficient detail to enable those skilled in the art to practice the invention.

It is to be appreciated that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be appreciated that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, preferred embodiments of the present invention will be described in detail with reference to the accompanying drawings so that those skilled in the art may easily implement the present invention.

Figure 2:
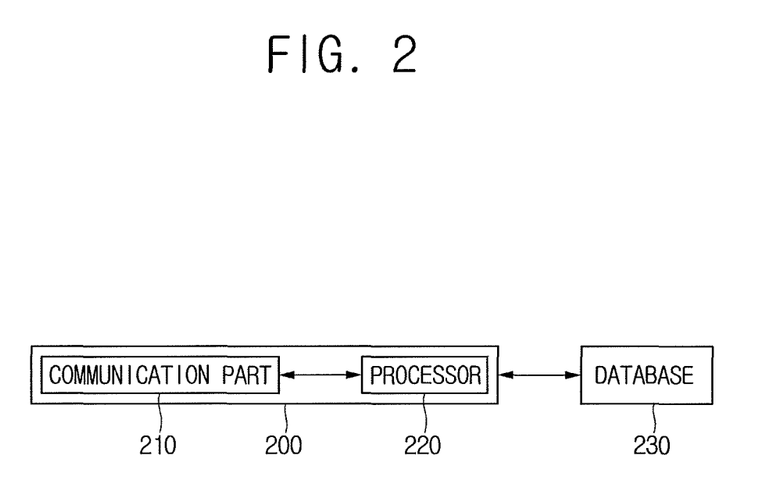
FIG. 2 is a block diagram showing a learning device in accordance with one example embodiment of the present invention.

FIG. 2 is a block diagram showing a learning device in accordance with one example embodiment of the present invention.

As illustrated in FIG. 2, the learning device 200 may include a communication part 210 and a processor 220. And, the learning device 200 may further include database 230. As the case may be, the learning device 200 may not include the database 230 unlike FIG. 2. Herein, any digital computing device with at least one processor to perform operations or computations may be adopted as the learning device 200 of the present invention.

The communication part 210 may be configured to acquire a training image or feature maps converted therefrom.

The processor 220 may be configured to perform a process of generating multiple pooled feature maps by applying pooling operations to respective areas, corresponding to those of predetermined number of proposal boxes generated by an N-way RPN, on at least two specific feature maps among a plurality of multi-scaled feature maps.

The processor 220 may further be configured to acquire a feature vector by applying a concatenation operation via an N-way pooling layer, and then to acquire comparative data by comparing a bounding box in the training image obtained through a Fully-Connected (FC) layer with that in a GT image, where the bounding box in the training image is acquired by passing the feature vector through the FC layer.

Besides, the processor may also be configured to adjust at least one of parameters of a CNN in the learning device 200 by using the comparative data during a backpropagation process. More details are to be disclosed and delineated in the following.

Meanwhile, the database 230 may be accessed by the communication part 210 of the learning device 200, and information on the comparative data, i.e., difference values or the losses, information on a classification result, information on the areas of the proposal boxes, and information on the parameters etc. may be recorded and stored in the database 230. For a reference, the classification result including information on which type, e.g., vehicle, passenger, and signs, the object belongs to is acquired through the FC layer.

Figure 3:
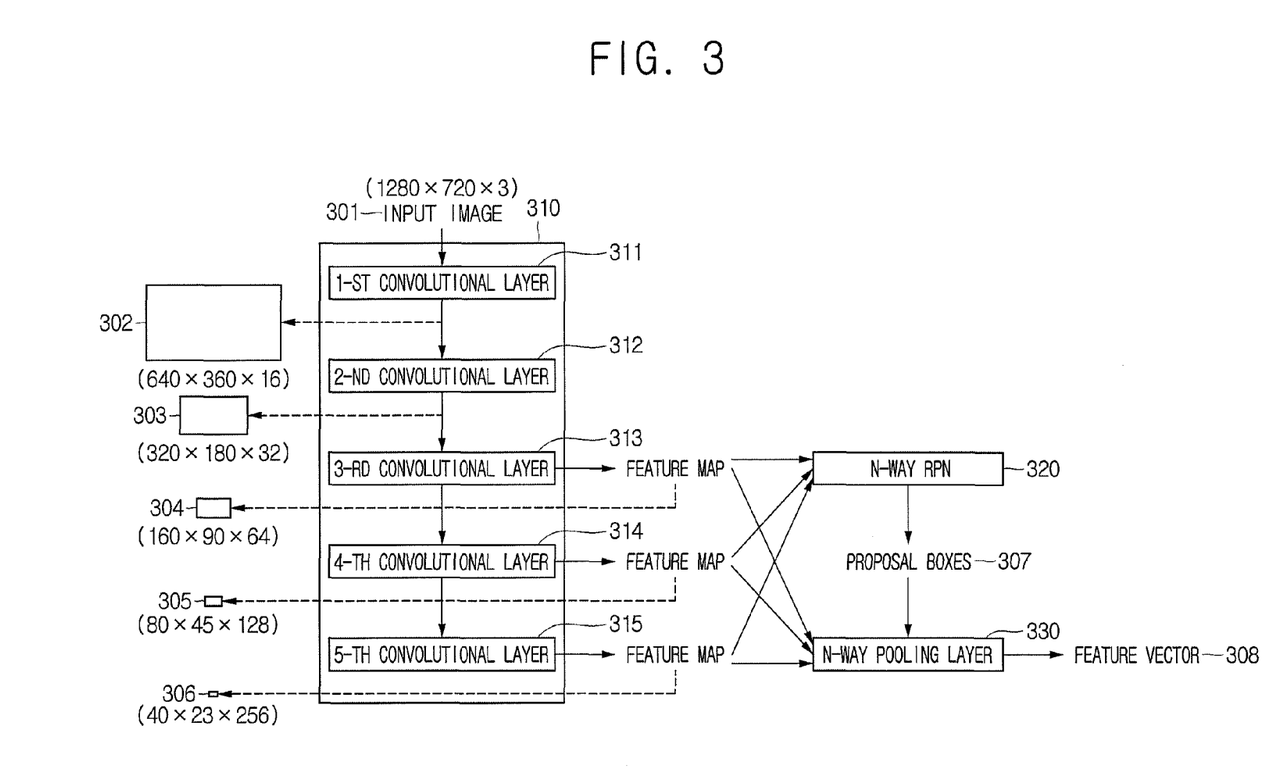
FIG. 3 is a drawing illustrating a process of acquiring a feature vector by applying a series of operations to at least two specific feature maps among multi-scaled feature maps in accordance with one example embodiment of the present invention.

FIG. 3 is a drawing illustrating a process of acquiring the feature vector by applying a series of operations to the at least two specific feature maps among the plurality of multi-scaled feature maps in accordance with one example embodiment of the present invention. The process of acquiring a feature vector 308 and the series of operations performed are delineated in more details in the following.

The learning device 200 in accordance with one example embodiment of the present invention may include a convolution block 310 with a plurality of convolutional layers 311~315, an N-way RPN (Region Proposal Network) 320, an N-way pooling layer 330 and a FC layer (not shown) and so forth.

As shown in FIG. 3, if the training image as an input image 301 is transmitted to the convolution block 310, the learning device 200 is configured to perform convolution operations multiple times through a plurality of convolutional layers 311-315 to thereby acquire multiple feature maps with different scales 302-306, i.e., multi-scaled feature maps. As an example, the convolution block 310 is comprised of five convolutional layers 311, 312, 313, 314 and 315. Whenever the individual convolutional layers respectively apply convolution operations to its input, width and height of the respective feature maps 302-306 are reduced and number of channels is increased as illustrated in FIG. 3.

For example, if the input image 301 with a size of 1280×720 pixels and the number of channels of 3 is transmitted to the first convolutional layer 311, the feature map 302 with a size of 640×360 pixels and the number of channels of 16 is generated as a result of the convolution operation. Likewise, the learning device 200 may allow the second convolutional layer 312 to receive the feature map 302 as its input and to generate the feature map 303 with a size of 320×180 pixels and the number of channels of 32. The rest convolutional layers may follow the same procedure and thus, the learning device 200 may generate the ultimate feature map 306 with the smallest size, e.g., 40×23 pixels, and the maximum number of channels, e.g., 256, among all the feature maps 302-306.

Herein, a degree of increment for the number of channels and a degree of decrement for the width and the height may be varied depending on parameters, i.e., weights, of the respective convolutional layers.

If the at least two specific feature maps among the multi-scaled feature maps are transmitted to the N-way RPN 320, the learning device 200 may allow the N-way RPN 320 to generate the predetermined number of the proposal boxes 307.

Referring to FIG. 3 again, as one preferred example embodiment of the present invention, the learning device 200 may allow the five convolutional layers 311-315 included in the convolution block 310 to generate the individual feature maps 302-306 with different sizes. Among the multi-scaled feature maps generated one by one through the respective five convolutional layers 311-315, the learning device 200 may allow the N-way RPN 320 to receive three specific feature maps 304-306 and to perform certain operations thereon for acquiring the predetermined number of the proposed boxes 307.

Specifically, the learning device 200 may allow the three specific feature maps 304, 305, and 306 to be transmitted to the N-way RPN 320 and instruct the N-way RPN 320 to perform RPN operations on the three specific feature maps 304-306.

As the case may be, the learning device 200 may allow at least any two specific feature maps to be arbitrarily selected among the multi-scaled feature maps and to be transmitted to the N-way RPN 320 without deciding any predetermined number of specific feature maps to be selected, but it is not limited thereto. As shown in FIG. 3, the learning device 200 may set the predetermined number, e.g., 3, of the specific feature maps be selected and be transmitted to the N-way RPN 320.

Thereafter, the learning device 200 may allow the N-way pooling layer 330 to receive the predetermined number of the proposal boxes 307 along with the at least two specific feature maps as its inputs, and to generate the feature vector 308 as its output by performing the pooling operations and the concatenation operation on its inputs. For example, the N-way pooling layer 330 may receive the proposal boxes 307 and the three specific feature maps 304-306.

In detail, the learning device 200 may allow the N-way pooling layer 330 to generate multiple pooled feature maps by applying a pooling operation to each of the areas, corresponding to each of the proposal boxes, on the at least two specific feature maps. As a preferred example embodiment, each pooling operation is applied to each area, corresponding to the proposal boxes, on the three specific feature maps.

Referring to FIG. 3 again, as an example, each of the three specific feature maps 304, 305, and 306 respectively generated by the 3rd convolutional layer 313, the 4-th convolutional layer 314, and the 5-th convolutional layer 315 may be transmitted to the N-way pooling layer 330 along with information on the proposal boxes 307 acquired from the N-way RPN 320 in order to acquire the feature vector 308.

That is, information on the areas related to the predetermined number of the proposal boxes on the three specific feature maps may be provided to the N-way pooling layer 330. As the case may be, however, the N-way pooling layer 330 may utilize information on the three feature maps that are inputs of the N-way pooling layer 330 and information provided regarding the predetermined number of the proposal boxes to acquire the information on the areas described above.

More details and descriptions with respect to the N-way RPN 320 and the N-way pooling layer 330 will be given later. Though it is not illustrated in the FIG. 3, if the feature vector 308 is transmitted to the FC layer, regression and classification operations may be performed on the feature vector 308 to generate an estimated bounding box and the classification result which tells a category of the object, as partially shown in FIG. 1.

For a reference, the learning device 200 may be comprised of several other digital computing devices to perform each of functions or processes disclosed herein. Nonetheless, an assumption that the learning device 200 is implemented by a single digital computing device is made in the disclosure of the present invention for a convenience of descriptions and illustrations.

Figure 4:
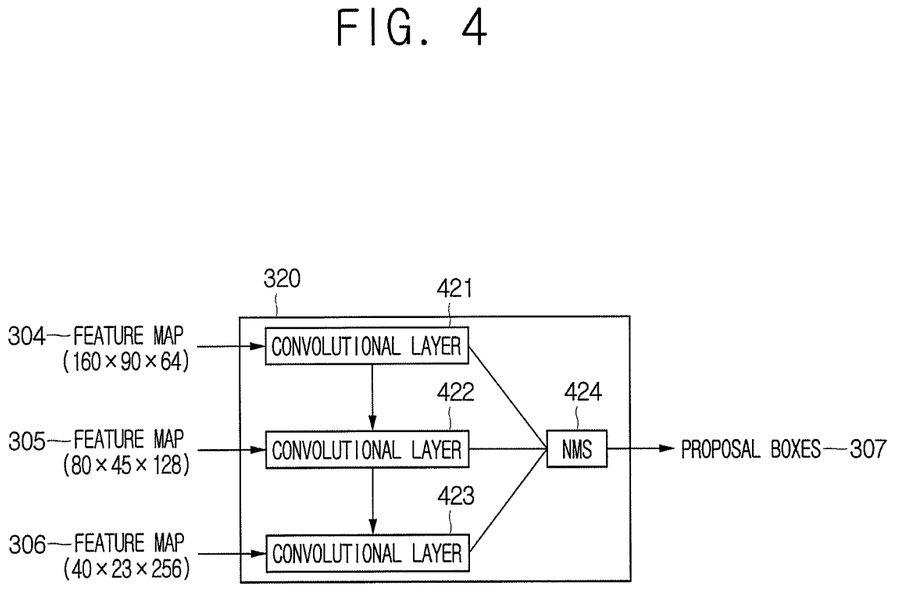
FIG. 4 is a drawing illustrating a process of generating predetermined number of proposal boxes by applying operations to the at least two specific feature maps by an N-way RPN in accordance with one example embodiment of the present invention.

FIG. 4 is a drawing illustrating a process of generating the predetermined number of the proposal boxes by applying the certain operations to at least two multi-scaled feature maps through the N-way RPN in accordance with one preferred example embodiment of the present invention.

Generally, the learning device 200 may acquire from the N-way RPN 320 the predetermined number of the proposal boxes 307 which are selected among overall anchor boxes that are possibly generated from the at least two specific feature maps. An arbitrary number of anchor boxes may be produced from a single pixel and the overall anchor boxes are generated from each of pixels included in the at least two specific feature maps. A portion of the overall anchor boxes may be selected by the N-way RPN 320 as the proposal boxes 307 based on definite criteria.

Herein, the definite criteria may be scores which represent probabilities of containing the object in the RGB image or in the test image. The N-way RPN may compute a score for each of the overall anchor boxes by referring to the GT bounding box to see whether an anchor box contains the object or not.

In detail, the score may be defined as a ratio of a first region corresponding to an intersection of each area of the overall anchor boxes and that of the GT bounding box to a second region corresponding to a union of each area of the overall anchor boxes and that of the GT bounding box. That is, the score may be the ratio computed as area of the first region to area of the second region stated above. For example, if a ratio, i.e., the area of the first region to the area of the second region, is 3/4 and another ratio is 1/3, a score value of 3/4 is apparently greater than that of 1/3 and thus an anchor box with the score value of 3/4 may be selected as one of the proposal boxes. Consequently, the learning device 200 may acquire from the N-way RPN 320 the predetermined number, e.g., 300, of the proposal boxes 307 by selecting anchor boxes with the top K highest scores.

For a reference, the score may also be defined as a distance value between coordinates of respective center points of both the GT bounding box and each generated anchor box. Or, the score may even be defined as a ratio of the height or the width of the GT bounding box to the height or the width of the generated anchor box, or a difference therebetween. In addition, the score may further be defined as a distance value between coordinates of respective predetermined points of both the GT bounding box and the generated anchor box.

Referring to FIG. 4, the learning device 200 may instruct respective RPN-specific convolutional layers 421, 422, and 423 within the N-way RPN 320 to receive the respective three specific feature maps 304-306 one by one, and to generate the overall anchor boxes from each of pixels respectively included in the three specific feature maps 304-306.

Herein, as an example, each of the pixels may generate 9 anchor boxes and each anchor box may have a width and a height fallen under a range of 0 to 32 pixels. Then, as described above, the respective scores of the overall anchor boxes may be computed via the certain operations. Also, the score may be denoted by a probability value which indicates whether a corresponding anchor box contains the object or not by referring to the GT bounding box, and the score may be computed by referring to information on the width, the height, and the coordinate of the corresponding anchor box. The information on the width, the height and the coordinate of each of the overall anchor boxes may represent its corresponding information on a width, a height and a coordinate thereof on the training image or the test image.

As delineated above, the overall anchor boxes indicates possibly generated different sized anchor boxes from the at least two specific feature maps. For example, the respective RPN-specific convolutional layers 421, 422, and 423 shown in FIG. 4 may sequentially and respectively receive the three specific feature maps 304-306, and respectively generate their corresponding anchor boxes with different sizes.

That is, a first RPN-specific convolutional layer 421 may be designed to produce its anchor boxes with one of the sizes among, e.g., 8×8, 16×16, 32×32, 6×11, 11×23, 23×45, 11×6, 23×11, and 45×23. Likewise, a second RPN-specific convolutional layer 422 may produce its anchor boxes with one of the sizes among, e.g., 32×32, 64×64, 128×128, 23×45, 45×91, 91×181, 45×23, 91×45, and 181×91. Finally, a third RPN-specific convolutional layer 423 may produce its anchor boxes with a size selected among 9 different sizes, e.g., 128×128, 256×256, 512×512, 91×181, 181×362, 362× 725, 181×91, 362×181, and 725×362. It should be conspicuous to those skilled in the art that the number of anchor boxes that each pixel in each feature map generates is not to be taken in a limiting sense, along with the size of each of the anchor boxes generated by each pixel therein.

Noticeably, the respective RPN-specific convolutional layers 421-423 may be designed to produce a plurality of varied-sized anchor boxes and thus, may have distinct parameters, i.e., weights, to perform operations on multi-scaled feature maps. As the case may be, another units, e.g., box generators, may be used in generating the plurality of the varied-sized anchor boxes instead of the respective RPN-specific convolutional layers.

Herein, a convolution operation performed by each of the RPN-specific convolutional layers is different from that performed by each of the five convolutional layers within the convolution block 310. The end of the former is to encrypt information on the training image or the test image into high-level features while the end of the latter is to encrypt information on each of the multiple feature maps with different scales into information for generating its corresponding anchor boxes.

For example, the information on each of the overall anchor boxes may be represented by channels of respective feature maps acquired via the RPN-specific convolutional layers. As the example mentioned above, assuming that each pixel generates 9 anchor boxes and each of which contains information on score1, score2, x coordinate, y coordinate, width, and height. Herein, score1 and score2 may individually represent the probabilities of an anchor box containing foreground object or background information. Information on [x, y, width, height] of the anchor box may represent location information of the anchor box on an input image, e.g., the training image or the test image. Hence, the convolution operation performed by each of the RPN-specific convolutional layer changes number of channels of each of multiple specific feature maps to a fixed number, e.g., 6*9 or 54, to represent the information on the overall anchor boxes.

Moreover, the certain operations performed by the N-way RPN mentioned above further includes the NMS operations applied to the overall anchor boxes by an NMS unit 424, in addition to the operation of generating the overall anchor boxes with their corresponding information, e.g., scores, by the respective RPN-specific convolutional layers.

The NMS unit 424 may sort the overall anchor boxes generated from the at least two specific feature maps by their corresponding scores and may select a specified number of anchor boxes with the top K, e.g., 6000, highest sorted scores among the overall anchor boxes. For example, the NMS unit 424 illustrated in FIG. 4 may apply sorting operation to the overall anchor boxes produced from the three specific feature maps 304-306. Then, the NMS unit 424 may apply the NMS (Non-Maximum Suppression) operation to cast the predetermined number, e.g., 300, of anchor boxes to be used for the proposal boxes 307.

Figure 5:
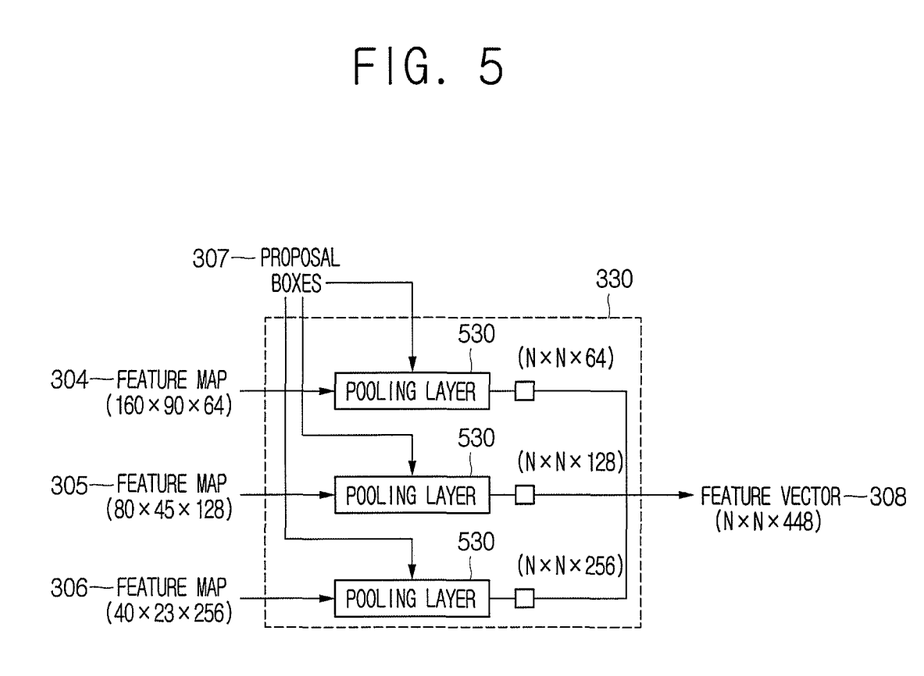
FIG. 5 is a drawing illustrating a process of generating a feature vector by applying pooling operations to the at least two specific feature maps by an N-way pooling layer in accordance with one example embodiment of the present invention.

FIG. 5 is a drawing illustrating a process of generating the feature vector by applying the pooling operations to at least two multi-scaled feature maps by the N-way pooling layer in accordance with one example embodiment of the present invention.

In general, the N-way pooling layer may receive information on the predetermined number of the proposal boxes 307 along with the at least two specific feature maps as its input. And the N-way pooling layer may perform the pooling operations on respective areas, corresponding to the individual proposal boxes, on the at least two specific feature maps in order to generate multiple pooled feature maps. Herein, the pooling operations may be either max pooling as usual or average pooling, and pooled feature maps may also be referred to as feature vectors.

Referring to FIG. 5, a 3-way pooling layer 330 is shown as an example embodiment of the present invention. The processor 220 of the learning device 200 may further be configured to concatenate each of the multiple pooled feature maps, i.e., three feature vectors, to a single feature vector as shown in FIG. 5, i.e., the feature vector 308. Each of the three pooled feature maps respectively having the number of channels of 64, 128 and 256 may be concatenated into the single feature vector 308 with a dimension of N×N×448. It is noticeable that the concatenation operation is performed on a basis of channel axis.

For a reference, the at least two specific feature maps may be respectively transmitted to separate pooling layers. As shown in FIG. 5, the three specific feature maps 304-306 are respectively transmitted to each of three pooling layers 530. However, in fact, the at least two specific feature maps may be respectively transmitted one by one to the same single pooling layer 530, as the case may be.

In the following, a criterion for selecting the at least two specific feature maps among the multi-scaled feature maps acquired from the convolution block 310 will be described in detail. Though the three specific feature maps are used throughout the accompanying drawings to elaborate on the technical features of the present invention, it is conspicuous for those skilled in the relevant art to appreciate that number of feature maps to be selected as inputs for each unit may be varied, and there should be the criterion for such a selection.

Assuming that the convolution block 310 includes at least a k-th and a (k+1)-th convolutional layers and the (k+1)-th convolutional layer is a layer disposed after the k-th convolutional layer, where k is an integer greater than or equal to 1 and less than or equal to n (n is an integer greater than or equal to 2), number of pixel data included in an area of a (k+1)-th bounding box acquired from the FC layer may be equal to or greater than number of pixel data included in an area of a k-th bounding box acquired from the same FC layer. Herein, the FC layer may receive a (k+1)-th pooled feature map obtained by applying a pooling operation to a (k+1)-th feature map which is a result of the (k+1)-th convolutional layer, and may also receive a k-th pooled feature map obtained by applying the pooling operation to a k-th feature map which is a result of the k-th convolutional layer.

For example, the number of pixel data included in the area of the (k+1)-th bounding box may fall within a range between 128 and 512, and that included in the area of the k-th bounding box may fall under a range between 32 and 128. Thus, the number of pixel data included in the area of the (k+1)-th bounding box may be greater than or equal to the number of pixel data included in the area of the k-th bounding box.

The (k+1)-th feature map has been undergone the convolution operation one more time than the k-th feature map, as a result, a size of the (k+1)-th feature map is smaller than that of the k-th feature map with respect to the height and the width. Therefore, an actual number of pixel data in the training image represented by a pixel data in the (k+1)-th feature map is greater than that of pixel data in the training image represented by a pixel data in the k-th feature map.

With such a characteristic, the criterion for selecting the at least two specific feature maps among the multi-scaled feature maps acquired from the convolution block 310 may be as the following.

As one example, (i) if the number of pixel data in the area of the object in the GT image corresponding to the object in the training image is less than a first threshold value, the at least two specific feature maps may be acquired from the convolutional layers disposed before a first preset convolutional layer; and (ii) if the number of pixel data in the area of the object in the GT image corresponding to the object in the training image is greater than or equal to the first threshold value, the at least two specific feature maps may be acquired from the convolutional layers disposed after the first preset convolutional layer or from the first preset convolutional layer.

For instance, as the example shown in FIG. 3, on condition that the convolution block 310 is comprised of five convolutional layers 311, 312, 313, 314 and 315, if the number of pixel data in the area of the object in the GT image is less than 128, the at least two specific feature maps may be acquired from the first and the second convolutional layers 311 and 312, upon setting the third convolutional layer 313 as the first preset convolutional layer. Conversely, if the number of the pixel data in the area of the object in the GT image is greater than or equal to 128, the at least two specific feature maps may be acquired from the fourth and the fifth convolutional layers 314 and 315.

As another example, if the number of pixel data in the area of the object in the GT image corresponding to the object in the training image is less than a second threshold value, the convolution operations may be performed up to the convolutional layers preceding a second preset convolutional layer. As a result, the multi-scaled feature maps may be acquired from the convolutional layers preceding the second preset convolutional layer.

The multi-scaled feature maps, or the at least two specific feature maps, may be acquired as the examples described above, but it is not limited thereto. It should be appreciated by those skilled in the art that the at least two specific feature maps or the multi-scaled feature maps which are inputs for the N-way RPN and the N-way pooling layer may be acquired from the third, the fourth, and the fifth convolutional layers as the accompanying drawings illustrated, or it may be acquired from the first, the third and the fifth convolutional layers as the case may be.

Figure 6:
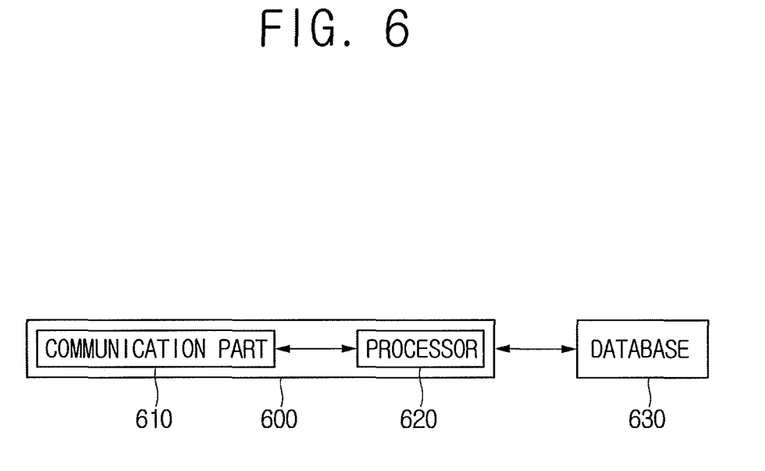
FIG. 6 is a block diagram showing a testing device in accordance with one example embodiment of the present invention.

FIG. 6 is a block diagram showing a testing device in accordance with one example embodiment of the present invention.

As shown in FIG. 6, the testing device 600 may include a communication part 610 and a processor 620. And the testing device 600 may further include a database 630. As the case may be, the testing device 600 may not include the database 630. Herein, the communication part 610 may receive a test image (or multi-scaled feature maps converted from the test image) as an input image and the processor 620 is configured to execute functions of the convolution block 310, the N-way RPN 320, the N-way pooling layer 330, and the FC layer (not shown).

In the accompanying drawings, the testing device 600 is illustrated as a separate and different computing device, but it may be possible that the testing device 600 is the same computing device as the learning device 200 shown in FIG. 2.

On conditions that the process of adjusting at least one of the parameters of the convolution block 310, the N-way RPN 320, and the FC layer (not shown) has been executed, multi-scaled feature maps for testing may be acquired as a result of applying convolution operations to the test image by the convolution block 310, and at least two specific feature maps for testing among the multi-scaled feature maps for testing may be fed into the N-way RPN 320.

Thereafter, the testing device 600 including the CNN with the adjusted parameters may acquire the predetermined number of proposal boxes for testing from the N-way RPN 320.

As mentioned in the learning method, the N-way RPN 320 may compute the scores by referring to the GT bounding box for training and may acquire the predetermined number of the proposal boxes 307 for training whose scores are top K sorted scores upon performing the learning method. However, in the testing method, the N-way RPN 320 may compute the scores by using the adjusted parameters and may acquire the predetermined number of the proposal boxes for testing whose scores are the top K sorted scores by applying the NMS operations as well.

For a reference, upon performing the testing method, the loss layers along with Ground Truth will be disregarded, and instead the adjusted parameters acquired through the learning method are being used.

Further, the testing device 600 may be configured to generate multiple pooled feature maps for testing by applying the pooling operations to respective areas, corresponding to the predetermined number of the proposal boxes for testing, on the at least two specific feature maps for testing.

In addition, the testing device 600 may be configured to acquire a feature vector for testing by concatenating the multiple pooled feature maps for testing and acquire a bounding box for testing by applying the regression operations to the feature vector for testing which is an input of the FC layer.

The bounding box for testing may have higher precision of accuracy, comparing it with a bounding box acquired by using parameters which have not yet been adjusted.

Finally, the testing device 600 may be comprised of the several other digital computing devices as disclosed within the present disclosure, however, as the case may be, the testing device 600 may be implemented as a single computing device. Also, the testing device 600 may include at least part of the convolution block, the N-way RPN, the N-way pooling layer and the FC layer.

The present invention has an effect of allowing the N-way RPN to generate the predetermined number of the proposal boxes by using the multi-scaled feature maps.

Besides, the present invention has another effect of allowing the N-way pooling layer to generate the multiple pooled feature maps by applying the pooling operations to respective areas on the at least two specific feature maps among the multi-scaled feature maps, and further applying the concatenation operation to acquire the feature vector which is the input for the FC layer.

In addition, the present invention also has another effect of acquiring a bounding box with higher precision of accuracy for the object in the test image via the FC layer performing the regression operations on the feature vector with the adjusted parameters throughout the testing method.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled artisan in a pertinent field. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language codes made by a complier but also a high level codes that can be used by an interpreter etc., which is executed by a computing device. The aforementioned hardware device can work as more than a software module to perform the technical features of the present invention and they can do the same in the opposite case.

As seen above, the present invention has been specifically described by such matters as detailed components, limited embodiments, and drawings. While the invention has been shown and described with respect to the preferred embodiments, it, however, may be appreciated by those skilled in the art that various changes and modifications may be made without departing from the spirit and the scope of the present invention as defined in the following claims.

Accordingly, the thought of the present invention must not be confined to the explained preferred or example embodiments, and the following patent claims as well as everything including variations equal or equivalent to the patent claims pertain to the category of the thought of the present invention.

What is claimed is:

1. A learning method for acquiring a bounding box corresponding to an object in a training image from multi-scaled feature maps by using a CNN, comprising steps of:
    (a) a learning device, if the multi-scaled feature maps are generated as a result of applying convolution operations to the training image, allowing an N-way Region Proposal Network (RPN) to acquire at least two specific feature maps among the multi-scaled feature maps as inputs and then allowing the N-way RPN to apply certain operations to the at least two specific feature maps to thereby generate predetermined number of proposal boxes;
    (b) the learning device allowing an N-way pooling layer to generate multiple pooled feature maps by applying pooling operations to respective areas, corresponding to that of the predetermined number of the proposal boxes, on the at least two specific feature maps; and
    (c) the learning device performing processes of (i) allowing a FC layer to acquire information on pixel data of the bounding box by applying regression operations to the multiple pooled feature maps, and (ii) allowing a loss layer to acquire first comparative data by comparing between the information on the pixel data of the bounding box in the training image and that of a GT bounding box in a GT image, thereby adjusting at least one of parameters of the CNN by using the first comparative data during a backpropagation process.

2. The learning method of claim 1, wherein the learning device, at the step of (c), performs processes of (i) allowing the N-way pooling layer to acquire a feature vector by concatenating the multiple pooled feature maps, (ii) allowing the FC layer to acquire the information on the pixel data of the bounding box by applying the regression operations to the feature vector, and (iii) allowing the loss layer to acquire the first comparative data by comparing between the information on the pixel data of the bounding box and the information on the pixel data of the GT bounding box, thereby adjusting at least one of the parameters of the CNN by using the first comparative data during the backpropagation process.

3. The learning method of claim 1, wherein, at the step of (a), upon acquiring the predetermined number of the proposal boxes among overall anchor boxes generated from the at least two specific feature maps among the multi-scaled feature maps, the learning device obtains scores as probability values each of which indicates whether each of the overall anchor boxes includes at least one object by referring to the GT bounding box, and allows the N-way RPN to acquire the predetermined number of the proposal boxes by referring to the scores.

4. The learning method of claim 3, wherein each of the scores is a value determined by referring to a ratio of (i) an area corresponding to an intersection of an area of the GT bounding box and that of each of the overall anchor boxes to (ii) an area corresponding to a union of the area of the GT bounding box and the area of each of the overall anchor boxes.

5. The learning method of claim 3, wherein the N-way RPN includes RPN-specific convolutional filters and an NMS unit, and wherein the N-way RPN allows the at least two specific feature maps among the multi-scaled feature maps to be supplied to each of the RPN-specific convolutional filters that is corresponding to each of the at least two specific feature maps, to thereby acquire information on the scores of the overall anchor boxes or information on coordinates thereof through predetermined operations of the RPN-specific convolutional filters.

6. The learning method of claim 3, wherein the N-way RPN includes RPN-specific convolutional filters and an NMS unit, and wherein the N-way RPN allows the NMS unit to select the predetermined number of the proposal boxes whose scores are Top K scores among the scores of the overall anchor boxes.

7. The learning method of claim 1, wherein, on condition that multiple convolutional layers include at least a k-th layer and a (k+1)-th layer and the (k+1)-th layer is a layer disposed after the k-th layer, number of pixel data included in the area of a (k+1)-th bounding box acquired from the FC layer performing operations on a (k+1)-th pooled feature map is greater than or equal to that included in the area of a k-th bounding box acquired from the FC layer applying the same operations to a k-th pooled feature map, and wherein k is an integer greater than or equal to 1 and less than or equal to n and n is an integer greater than or equal to 2.

8. The learning method of claim 7, wherein (i) if the number of pixel data in an area of an object in a GT image corresponding to the object in the training image is less than a first threshold value, the at least two specific feature maps which are inputs for the N-way RPN are acquired from at least part of convolutional filters disposed before a first preset convolutional filter; and (ii) if the number of pixel data of the area of the object in the GT image corresponding to the object in the training image is greater than or equal to the first threshold value, the at least two specific feature maps which are inputs for the N-way RPN are acquired from at least part of the convolutional filters disposed after the first preset convolutional filter or from the first preset convolutional filter.

9. The learning method of claim 7, wherein, if the number of pixel data in the area of the object in the GT image corresponding to the object in the training image is less than a second threshold value, the convolution operations are performed up to the convolutional filters preceding a second preset convolutional filter among the multiple convolutional filters, thereby acquiring the multi-scaled feature maps.

10. The learning method of claim 1, wherein, at the step of (c), the learning device performs processes of (i) allowing the FC layer to acquire information on a type of the object in the training image through classification operations and (ii) allowing the loss layer to acquire second comparative data by comparing between the information on the type of the object in the training image and that of the object in the GT image, thereby adjusting at least one of the parameters of the CNN by using the second comparative data during the backpropagation process.

11. A testing method for acquiring a bounding box for testing corresponding to an object for testing in a test image from multi-scaled feature maps for testing by using a CNN in a testing device, comprising steps of:
(a) the testing device, if the multi-scaled feature maps for testing are generated as a result of applying convolution operations to the testing image, allowing an N-way Region Proposal Network (RPN) to acquire at least two specific feature maps for testing among the multi-scaled feature maps for testing as inputs and then allowing the N-way RPN to apply certain operations to the at least two specific feature maps for testing to thereby generate predetermined number of proposal boxes for testing, on conditions that processes of (1) a learning device, if multi-scaled feature maps for training are generated as a result of applying convolution operations to a training image through multiple convolutional layers, allowing the N-way RPN to acquire at least two specific feature maps for training among the multi-scaled feature maps for training as inputs, and then allowing the N-way RPN to apply certain operations to the at least two specific feature maps for training to thereby generate predetermined number of proposal boxes for training, (2) the learning device allowing an N-way pooling layer to generate multiple pooled feature maps for training by applying pooling operations to respective areas, corresponding to that of the predetermined number of the proposal boxes, on the at least two specific feature maps for training, and (3) the learning device allowing a FC layer to acquire information on pixel data of a bounding box for training by applying regression operations to the multiple pooled feature maps for training, and the learning device allowing a loss layer to acquire comparative data by comparing between the information on the pixel data of the bounding box for training and that of a bounding box in a GT image, thereby adjusting at least one of parameters of the CNN by using the comparative data during a backpropagation process have been performed;
(b) the testing device allowing the N-way pooling layer to generate multiple pooled feature maps for testing by applying the pooling operations to respective areas, corresponding to the predetermined number of the proposal boxes for testing, on the at least two specific feature maps for testing; and
(c) the testing device allowing the FC layer to acquire information on pixel data of the bounding box for testing by applying the regression operations to the multiple pooled feature maps for testing.

12. The method of claim 11, wherein the testing device, at the step of (c), performs processes of (i) allowing the N-way pooling layer to acquire a feature vector for testing by concatenating the multiple pooled feature maps for testing, and (ii) allowing the FC layer to acquire the information on the pixel data of the bounding box for testing by applying the regression operations to the feature vector for testing.

13. The method of claim 11, wherein the testing device, at the step of (a), upon acquiring the predetermined number of the proposal boxes for testing among overall anchor boxes for testing generated from the at least two specific feature maps for testing, obtains scores as probability values each of which indicates whether or not each of the overall anchor boxes for testing includes at least one object by referring to the GT bounding box, and allows the N-way RPN to acquire the predetermined number of the proposal boxes for testing by referring to the scores.

14. The method of claim 13, wherein the N-way RPN includes RPN-specific convolutional filters and an NMS unit, and wherein the N-way RPN allows the at least two specific feature maps for testing to be supplied to each of the RPN-specific convolutional filters that is corresponding to each of the at least two specific feature maps for testing, to thereby acquire information on the scores of the overall anchor boxes for testing or information on coordinates thereof through predetermined operations of the RPN-specific convolutional filters.

15. The method of claim 13, wherein the N-way RPN includes RPN-specific convolutional filters and an NMS unit, and wherein the N-way RPN allows the NMS unit to select the predetermined number of the proposal boxes for testing whose scores are Top K scores among the scores of the overall anchor boxes for testing.

16. A learning device for acquiring a bounding box corresponding to an object in a training image from multi-scaled feature maps by using a CNN, comprising:
 a communication part for acquiring the training image; and
 a processor for performing processes of (1) if the multi-scaled feature maps are generated as a result of applying convolution operations to the training image, allowing an N-way Region Proposal Network (RPN) to acquire at least two specific feature maps among the multi-scaled feature maps as inputs and then allowing the N-way RPN to apply certain operations to the at least two specific feature maps to thereby generate predetermined number of proposal boxes; (2) allowing an N-way pooling layer to generate multiple pooled feature maps by applying pooling operations to respective areas, corresponding to that of the predetermined number of the proposal boxes, on the at least two specific feature maps; and (3) (i) allowing a FC layer to acquire information on pixel data of the bounding box by applying regression operations to the multiple pooled feature maps, and (ii) allowing a loss layer to acquire first comparative data by comparing between the information on the pixel data of the bounding box in the training image and that of a GT bounding box in a GT image, thereby adjusting at least one of parameters of the CNN by using the first comparative data during a backpropagation process.

17. The learning device of claim 16, wherein, at the process of (3), the processor is configured to perform processes of (i) allowing the N-way pooling layer to acquire a feature vector by concatenating the multiple pooled feature maps, (ii) allowing the FC layer to acquire the information on the pixel data of the bounding box by applying the regression operations to the feature vector, and (iii) allowing the loss layer to acquire the first comparative data by comparing between the information on the pixel data of the bounding box and the information on the pixel data of the GT bounding box, thereby adjusting at least one of the parameters of the CNN by using the first comparative data during the backpropagation process.

18. The learning device of claim 16, wherein, at the process of (1), upon acquiring the predetermined number of the proposal boxes among overall anchor boxes generated from the at least two specific feature maps among the multi-scaled feature maps, the processor obtains scores as probability values each of which indicates whether each of the overall anchor boxes includes at least one object by referring to the GT bounding box, and allows the N-way RPN to acquire the predetermined number of the proposal boxes by referring to the scores.

19. The learning device of claim 18, wherein each of the scores is a value determined by referring to a ratio of (i) an area corresponding to an intersection of an area of the GT bounding box and that of each of the overall anchor boxes to (ii) an area corresponding to a union of the area of the GT bounding box and the area of each of the overall anchor boxes.

20. The learning device of claim 18, wherein the N-way RPN includes RPN-specific convolutional filters and an NMS unit, and wherein the N-way RPN allows the at least two specific feature maps among the multi-scaled feature maps to be supplied to each of the RPN-specific convolutional filters that is corresponding to each of the at least two specific feature maps, to thereby acquire information on the scores of the overall anchor boxes or information on coordinates thereof through predetermined operations of the RPN-specific convolutional filters.

21. The learning device of claim 18, wherein the N-way RPN includes RPN-specific convolutional filters and an NMS unit, and wherein the N-way RPN allows the NMS unit to select the predetermined number of the proposal boxes whose scores are Top K scores among the scores of the overall anchor boxes.

22. The learning device of claim 16, wherein, on condition that multiple convolutional layers include at least a k-th layer and a (k+1)-th layer and the (k+1)-th layer is a layer disposed after the k-th layer, number of pixel data included in the area of a (k+1)-th bounding box acquired from the FC layer performing operations on a (k+1)-th pooled feature map is greater than or equal to that included in the area of a k-th bounding box acquired from the FC layer applying the same operations to a k-th pooled feature map, and wherein k is an integer greater than or equal to 1 and less than or equal to n and n is an integer greater than or equal to 2.

23. The learning device of claim 22, wherein (i) if the number of pixel data in an area of an object in a GT image corresponding to the object in the training image is less than a first threshold value, the at least two specific feature maps which are inputs for the N-way RPN are acquired from at least part of convolutional filters disposed before a first preset convolutional filter; and (ii) if the number of pixel data of the area of the object in the GT image corresponding to the object in the training image is greater than or equal to the first threshold value, the at least two specific feature maps which are inputs for the N-way RPN are acquired from at least part of the convolutional filters disposed after the first preset convolutional filter or from the first preset convolutional filter.

24. The learning device of claim 22, wherein if the number of pixel data in the area of the object in the GT image corresponding to the object in the training image is less than a second threshold value, the convolution operations are performed up to the convolutional filters preceding a second preset convolutional filter among the multiple convolutional filters, thereby acquiring the multi-scaled feature maps.

25. The learning device of claim 16, wherein, at the process of (3), the processor performs processes of (i) allowing the FC layer to acquire information on a type of the object in the training image through classification operations and (ii) allowing the loss layer to acquire second comparative data by comparing between the information on the type of the object in the training image and that of the object in the GT image, thereby adjusting at least one of the parameters of the CNN by using the second comparative data during the backpropagation process.

26. A test device for acquiring a bounding box for testing corresponding to an object for testing in a test image from multi-scaled feature maps for testing by using a CNN in a testing device, comprising:
 a communication part for acquiring the test image, on conditions that learning processes of (i) a learning device, if multi-scaled feature maps for training are generated as a result of applying convolution operations to a training image through multiple convolutional layers, allowing an N-way RPN to acquire at least two specific feature maps for training among the multi-scaled feature maps for training as inputs, and then allowing the N-way RPN to apply certain operations to the at least two specific feature maps for training to thereby generate predetermined number of proposal boxes for training, (ii) the learning device allowing an N-way pooling layer to generate multiple pooled feature maps for training by applying pooling operations to respective areas, corresponding to that of the predetermined number of the proposal boxes, on the at least two specific feature maps for training, and (iii) the learning device allowing a FC layer to acquire information on pixel data of a bounding box for training by applying regression operations to the multiple pooled feature maps for training, and the learning device allowing a loss layer to acquire comparative data by comparing between the information on the pixel data of the bounding box for training and that of a bounding box in a GT image, thereby adjusting at least one of parameters of the CNN by using the comparative data during a backpropagation process have been performed; and a processor for performing processes of (1) if the multi-scaled feature maps for testing are generated as a result of applying convolution operations to the testing image, allowing the N-way Region Proposal Network (RPN) to acquire at least two specific feature maps for testing among the multi-scaled feature maps for testing as inputs and then allowing the N-way RPN to apply certain operations to the at least two specific feature maps for testing to thereby generate predetermined number of proposal boxes for testing, (2) allowing the N-way pooling layer to generate multiple pooled feature maps for testing by applying the pooling operations to respective areas, corresponding to the predetermined number of the proposal boxes for testing, on the at least two specific feature maps for testing; and (3) allowing the FC layer to acquire information on pixel data of the bounding box for testing by applying the regression operations to the multiple pooled feature maps for testing.

27. The device of claim 26, wherein, at the process of (3), the processor is configured to perform processes of (i) allowing the N-way pooling layer to acquire a feature vector for testing by concatenating the multiple pooled feature maps for testing, and (ii) allowing the FC layer to acquire the information on the pixel data of the bounding box for testing by applying the regression operations to the feature vector for testing.

28. The device of claim 26, wherein, at the process of (1), upon acquiring the predetermined number of the proposal boxes for testing among overall anchor boxes for testing generated from the at least two specific feature maps for testing, the processor obtains scores as probability values each of which indicates whether or not each of the overall anchor boxes for testing includes at least one object by referring to the GT bounding box, and allows the N-way RPN to acquire the predetermined number of the proposal boxes for testing by referring to the scores.

29. The device of claim 28, wherein the N-way RPN includes RPN-specific convolutional filters and an NMS unit, and wherein the N-way RPN allows the at least two specific feature maps for testing to be supplied to each of the RPN-specific convolutional filters that is corresponding to each of the at least two specific feature maps for testing, to thereby acquire information on the scores of the overall anchor boxes for testing or information on coordinates thereof through predetermined operations of the RPN-specific convolutional filters.

30. The device of claim 28, wherein the N-way RPN includes RPN-specific convolutional filters and an NMS unit, and wherein the N-way RPN allows the NMS unit to select the predetermined number of the proposal boxes for testing whose scores are Top K scores among the scores of the overall anchor boxes for testing.

* * * * *